(12) United States Patent
Nace et al.

(10) Patent No.: US 12,404,678 B2
(45) Date of Patent: Sep. 2, 2025

(54) PANEL CLIP AND METHOD FOR INSTALLATION

(71) Applicant: Key-Link Fencing & Railing, Inc., New Holland, PA (US)

(72) Inventors: Austin S. Nace, Pottstown, PA (US); Michael A. Alexander, Smoketown, PA (US); Jared C. Detweiler, York, PA (US); Aleksey A. Sholka, Lancaster, PA (US)

(73) Assignee: Key-Link Fencing & Railing, Inc., New Holland, PA (US)

( * ) Notice: Subject to any disclaimer, the term of this patent is extended or adjusted under 35 U.S.C. 154(b) by 403 days.

(21) Appl. No.: 18/094,702

(22) Filed: Jan. 9, 2023

(65) Prior Publication Data
US 2024/0229842 A1   Jul. 11, 2024

(51) Int. Cl.
*E04F 11/18*  (2006.01)
*E04H 17/16*  (2006.01)

(52) U.S. Cl.
CPC ...... *E04F 11/1817* (2013.01); *E04F 11/1851* (2013.01); *E04H 17/17* (2021.01); *E04F 2011/1831* (2013.01)

(58) Field of Classification Search
CPC ..... A47F 3/12; E04F 11/1817; E04F 11/1851; E04F 11/1853; E04F 2011/1819; E04F 2011/1831; E04H 17/17; E06D 11/1014; E06D 11/1024; E06D 11/1064; E06D 11/1078; E06B 3/5454; E06B 3/5481; F16B 2/10; F16B 5/0685; F16B 9/052; Y10S 403/10; Y10T 16/5383; Y10T 403/3906; Y10T 403/7176

USPC .............. 16/286; 256/24, 31; 403/188, 397, 403/DIG. 10

See application file for complete search history.

(56) References Cited

U.S. PATENT DOCUMENTS

| | | |
|---|---|---|
| 771,215 A | 9/1904 | Soule |
| 927,092 A | 7/1909 | Bartelstone |
| 997,202 A | 7/1911 | McAvoy |
| 1,687,305 A | 10/1928 | Nelson |
| 5,079,798 A | 1/1992 | Burke et al. |
| 5,867,869 A | 2/1999 | Garrett et al. |
| 5,893,181 A | 4/1999 | Moncaster |

(Continued)

FOREIGN PATENT DOCUMENTS

| | | | | |
|---|---|---|---|---|
| EP | 1630333 A1 * | 3/2006 | ......... | E05D 11/1064 |
| EP | 1772578 A1 * | 4/2007 | ......... | E05D 11/1014 |
| WO | WO-2009015550 A1 * | 2/2009 | ......... | E05D 11/1064 |

*Primary Examiner* — Josh Skroupa
(74) *Attorney, Agent, or Firm* — Saxton & Stump, LLC (57) ABSTRACT

A multi-component installation clip and method for installation of panel components. The multi-component installation clip includes a base member, a first clipping member and a second clipping member. Each of the first and second clipping members have clipping features. The first clipping feature and the second clipping feature are configured to engage each other and induce rotation as the first attachment portion and the second attachment portion are drawn together. The rotation induced is a pivoting of the first gripping portion and the second gripping portion about the center axis in a direction toward each other to grip a panel component. A second attachment portion includes an attachment feature arranged and disposed to engage a receiving portion of the base member.

22 Claims, 9 Drawing Sheets

(56) References Cited

U.S. PATENT DOCUMENTS

| | | | |
|---|---|---|---|
| 6,070,294 A * | 6/2000 | Perkins | E05D 11/1064 |
| | | | 16/334 |
| 6,704,966 B1 | 3/2004 | Kao | |
| 7,010,832 B2 * | 3/2006 | Chen | E05D 11/1064 |
| | | | 16/235 |
| 7,493,673 B2 | 2/2009 | Garrett | |
| 8,453,383 B2 | 6/2013 | Barr et al. | |
| 8,549,817 B2 | 10/2013 | Burke et al. | |
| 8,756,866 B2 | 6/2014 | Lee | |
| 9,803,361 B2 | 10/2017 | Von Hoyningen Huene et al. | |
| 9,822,571 B2 | 11/2017 | Reinke et al. | |
| 10,144,359 B2 * | 12/2018 | Zander | F16B 2/02 |
| 10,448,754 B1 | 10/2019 | Chang et al. | |
| 11,168,501 B2 | 11/2021 | Pavlovic | |
| 2005/0125949 A1 * | 6/2005 | Lin | E05D 11/1064 |
| | | | 16/248 |
| 2007/0175231 A1 | 8/2007 | Arrosagaray et al. | |
| 2008/0174216 A1 | 7/2008 | Bries et al. | |
| 2008/0244981 A1 | 10/2008 | Arimoto | |
| 2010/0275410 A1 * | 11/2010 | Chang | E05D 11/1014 |
| | | | 16/277 |
| 2012/0079682 A1 * | 4/2012 | Cheng | E05D 11/1064 |
| | | | 16/252 |
| 2014/0076947 A1 | 3/2014 | McDonald | |
| 2022/0314762 A1 | 10/2022 | Barr et al. | |

* cited by examiner

PANEL CLIP AND METHOD FOR INSTALLATION

FIELD OF THE INVENTION

The present disclosure is generally directed to systems and methods for construction or renovation. In particular, the present disclosure is directed to a system and method for panel installation, particularly for fencing and railing.

BACKGROUND OF THE INVENTION

Known processes and equipment known for installation of panels for fencing or railing are either complicated or lack flexibility. For example, known techniques for installation of plate glass railing involve two component clip members, where one component is attached to post or other support and the second component is utilized to clamp onto the plate glass. Such known clip members are difficult to install and do not provide flexibility of installation, particularly when supports are at angles or are offset from one another. In addition, known installation systems require two or more installers to install, for example, panel components like frameless glass railing sections. It is desirable to have installation systems for panel components that require less installers or can be installed with a single installer.

What is needed is a panel clamp and method for installation that does not suffer from the drawbacks of prior art systems. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The present disclosure is directed to a multi-component installation clip having self-guided closing features resulting in a two-stage tightening system for applications for panel installation, particularly for panel fencing and railing.

One embodiment of the present disclosure includes a multi-component installation clip. The multi-component installation clip includes a base member having a base plate and a receiving portion extending from the base plate. In addition, the multi-component installation clip includes a first clipping member having a first attachment portion and a first gripping portion. The first attachment portion has a first clipping feature. A second clipping member includes a second attachment portion and a second gripping portion. The second attachment portion has a second clipping feature. The second attachment portion includes an attachment feature arranged and disposed to engage the receiving portion of the base member. The first clipping feature and the second clipping feature are configured to engage each other and induce rotation as the first attachment portion and the second attachment portion are drawn together. The rotation induced is a pivoting of the first gripping portion and the second gripping portion about the center axis in a direction toward each other to grip a panel component.

Another embodiment of the present disclosure includes a multi-component installation clip utilizing a fastener. The multi-component installation clip includes a base member having a base plate and a receiving portion extending from the base plate. In addition, the multi-component installation clip includes a first clipping member having a first attachment portion and a first gripping portion. The first attachment portion has a first clipping feature. A second clipping member includes a second attachment portion and a second gripping portion. The second attachment portion has a second clipping feature. The first attachment portion has a first aperture that permits passage of a fastener along a center axis of the first aperture. The first aperture includes a circumferential ledge onto which a head of the fastener is retained. The second attachment portion has a threaded second aperture that receives a first threaded portion of the fastener. The second attachment portion includes an attachment feature arranged and disposed to engage the receiving portion of the base member. The first clipping feature and the second clipping feature are configured to engage each other and induce rotation as the first attachment portion and the second attachment portion are drawn together. The rotation induced is a pivoting of the first gripping portion and the second gripping portion about the center axis in a direction toward each other to grip a panel component.

Another embodiment of the present disclosure includes a method for installing a panel component. The includes providing a multi-component installation clip having a first clipping member having a first attachment portion and a first gripping portion, a second clipping member having a second attachment portion and a second gripping portion, and a base member having a base plate and a receiving portion extending from the base plate. The base member is attached to a support member. A panel component is positioned between the first gripping portion and the second gripping portion. A fastener is inserted through the first attachment portion. A first threaded portion of the fastener is driven into a correspondingly threaded portion of the second attachment portion to urge the first gripping portion and second gripping portion toward each other to grip the panel component. An attachment feature of the second attachment portion is directed into the receiving portion. A retention member is driven onto a second threaded portion of the fastener to secure the panel component into position.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Wherever possible, the same reference numbers will be used throughout the drawings to represent the same parts.

DETAILED DESCRIPTION OF THE INVENTION

The multi-component installation clip according to the present disclosure is a clamp for retaining panels, such as for fencing or railing panels. In one embodiment, the multi-component installation clip is a clamp for retaining plate glass panels for railing applications. The multi-component installation clip according to the present disclosure allow panels to be installed at various angles, including between offset supports. In addition, the multi-component installation clip according to the present disclosure provides a freedom in adjustment. For example, in known two-piece designs if you need to reposition a clip you must undo all clips and move the panel. However, for the multi-component installation clip according to the present disclosure, the installer can individually move the first and second clipping member portions of the multi-component installation clip instead of having to move the entire panel component.

Figure 1:
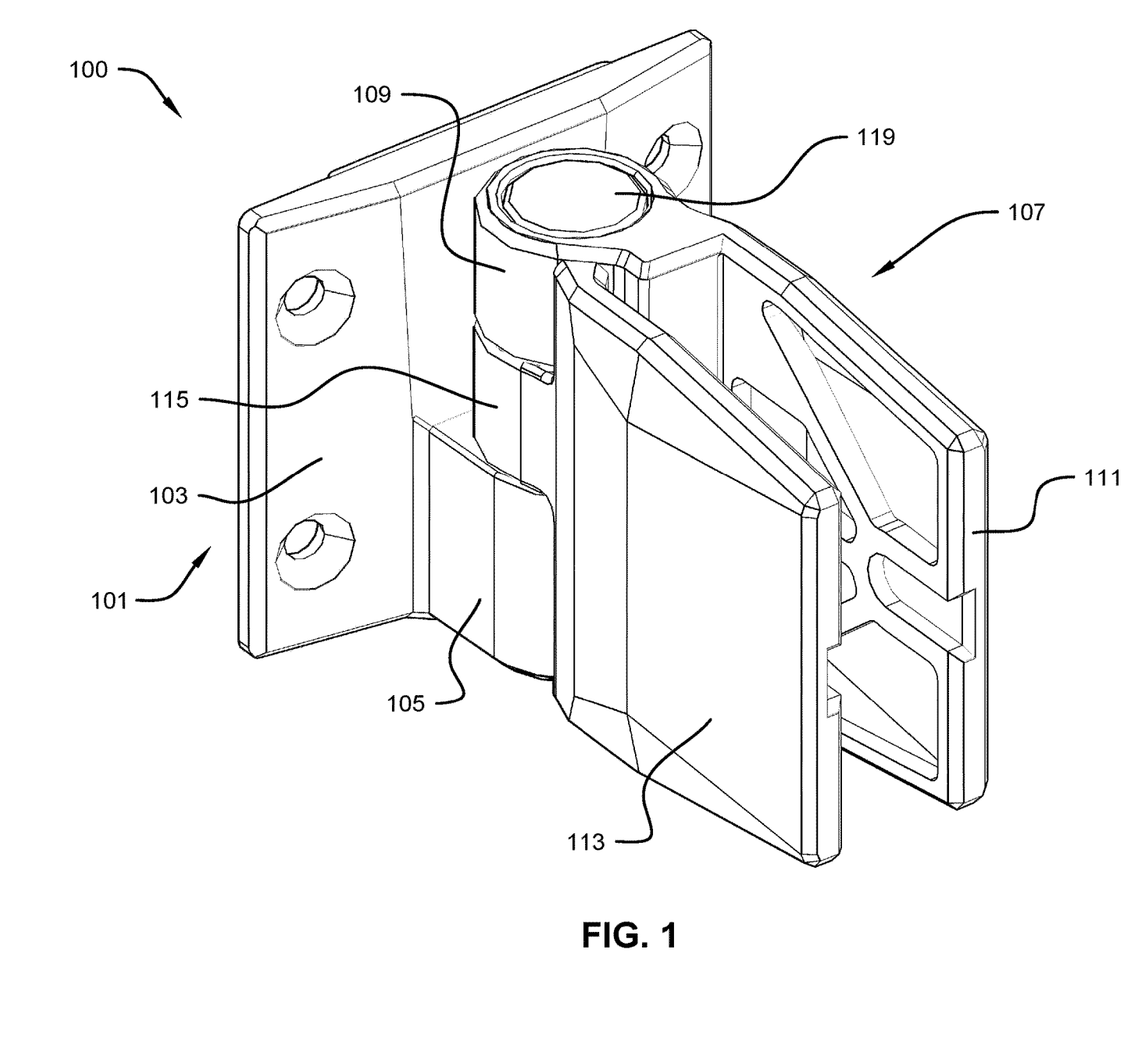
FIG. 1 shows a perspective view of a multi-component installation clip according to an embodiment of the present disclosure.
Figure 2A:
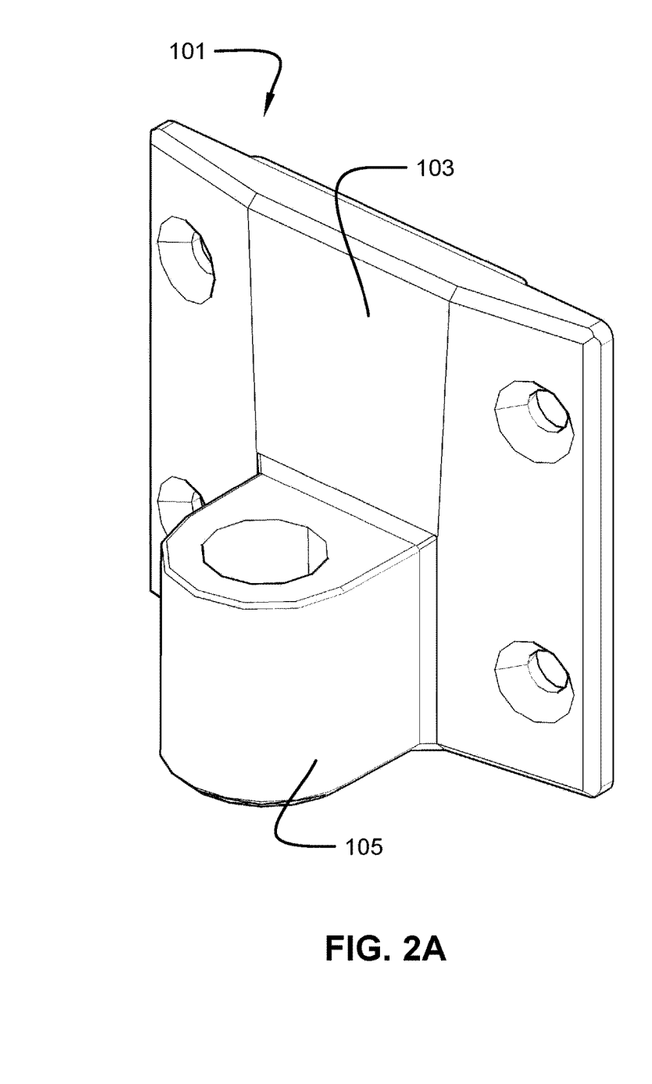
FIG. 2A shows a perspective view of a base member of the multi-component installation clip of FIG. 1 shown from above.
Figure 2B:
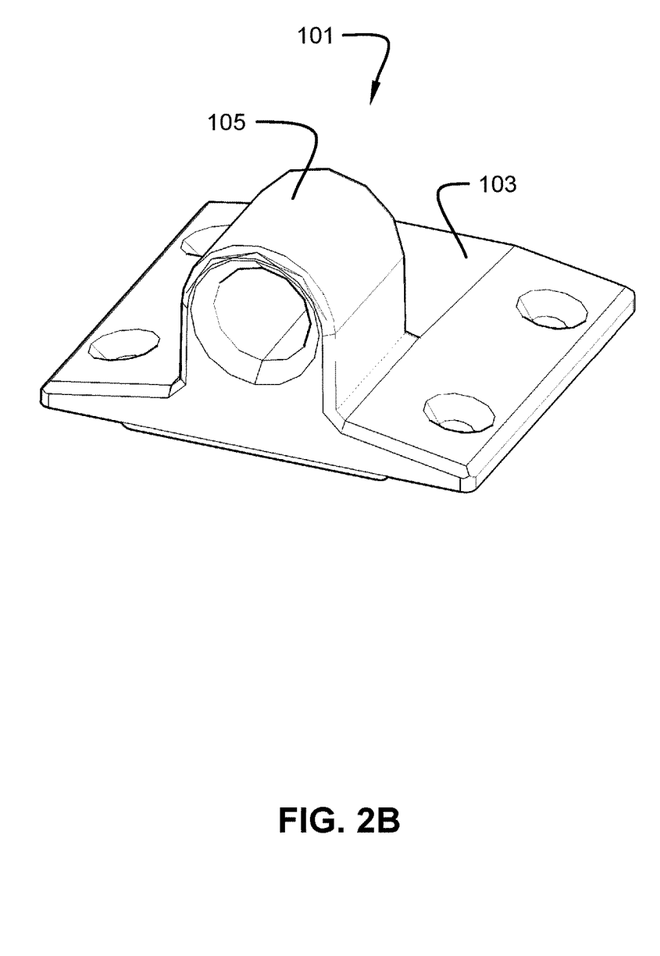
FIG. 2B shows a perspective view of a base member of the multi-component installation clip of FIG. 1 shown from below.
Figure 3A:
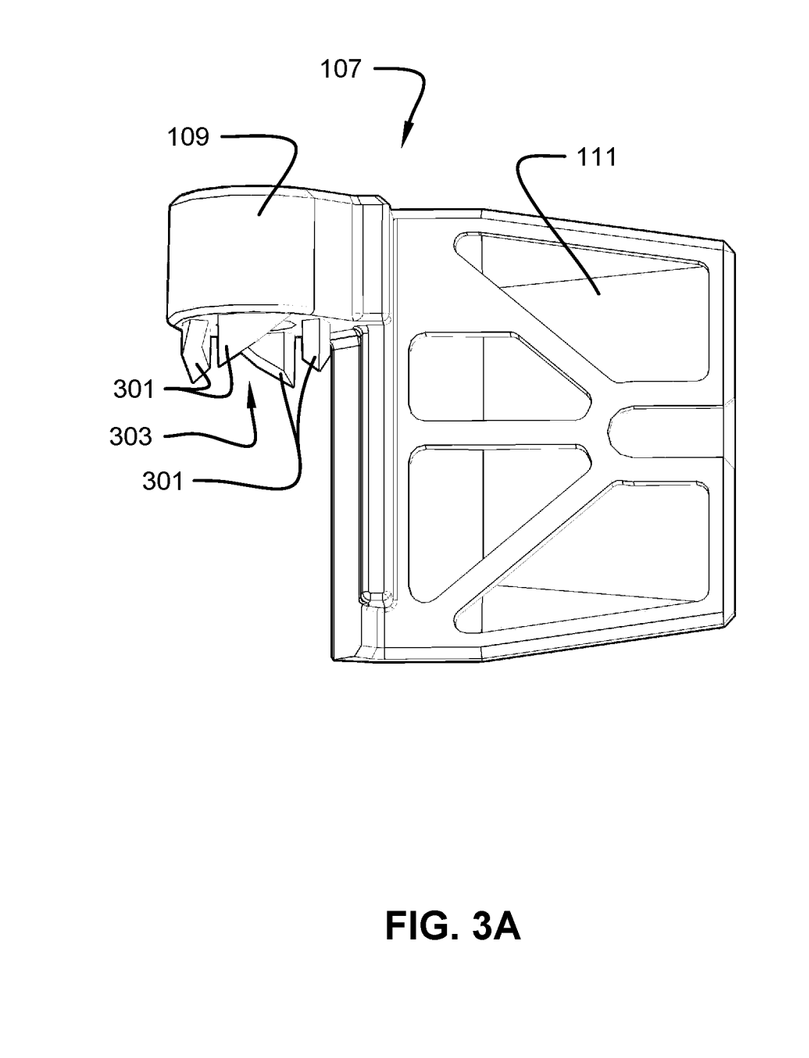
FIG. 3A shows a perspective view of a first clipping member of the multi-component installation clip of FIG. 1 shown from the side.
Figure 3B:
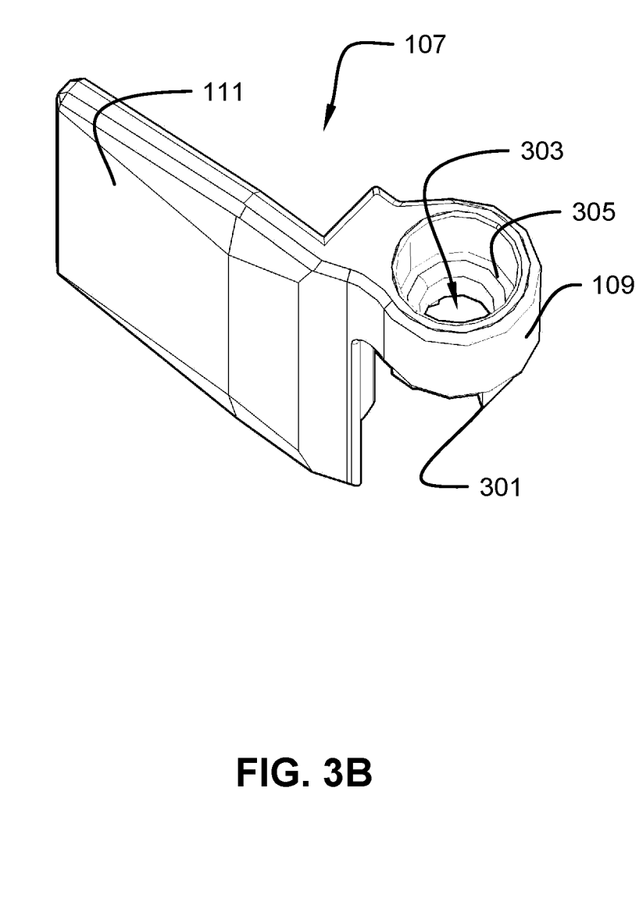
FIG. 3B shows a perspective view of a first clipping member of the multi-component installation clip of FIG. 1 shown from above.

FIG. 1 shows a multi-component installation clip 100 according to an embodiment of the present disclosure. The multi-component installation clip 100 includes a base member 101 having a base plate 103 and a receiving portion 105 extending from the base plate 103 (see FIGS. 2A and 2B). The receiving portion 105 includes a geometry and aperture that is capable of being a base for a hinge-like feature that permits the system to swivel and provide flexibility in installation. The multi-component installation clip 100 also includes a first clipping member 107 having a first attachment portion 109 and a first gripping portion 111; and a second clipping member 113 having a second attachment portion 115 and a second gripping portion 117. The first attachment portion 109 has at least one first clipping feature 301 (see FIGS. 3A and 3B). The second attachment portion 115 has at least one second clipping feature 401 (see FIGS. 4A and 4B). The first clipping feature 301 is a protrusion or other mechanical feature that engages the second clipping feature 401. The second clipping feature 401 is a slot or other mechanical feature that receives the first clipping feature 301. The first clipping feature 301 and the second clipping feature 401 are configured to engage each other and induce rotation as the first attachment portion 109 and the second attachment portion 115 are drawn together. The rotation induced is a pivoting of the first gripping portion 111 and the second gripping portion 117 about the center axis 501 in a direction toward each other to grip a panel component 601 or panel (see FIGS. 5 and 6). The panel component 601 is any suitable panel material for use in fencing or railing in construction or renovation. For example, the panel material may be glass, metal, wood, polymer or other material known for forming fencing or railing barriers. In the embodiment shown in FIGS. 3A, 3B, 4A and 4B, the first clipping feature 301 includes four protrusions having a triangular geometry with a curvature extending circumferentially along a surface of the first attachment portion 109. Likewise, the second clipping feature 401 shown includes four corresponding slots having inclined surfaces that receive first clipping features 301. The number and positioning is not limited to the number and position of the first clipping feature 301 and the second clipping feature 401. Other positions and numbers of first clipping features 301 and the second clipping features 401 may be utilized to provide a desired offset or positioning of the first clipping member 107 with respect to second clipping member 113. The engagement of the first clipping feature 301 to the second clipping feature 401 is such that upon movement of the first attachment portion 109 and the second attachment portion 115, there is a rotational force generated sufficient to urge the first gripping portion 111 toward second gripping portion 117. In the embodiment shown in FIGS. 3A, 3B, 4A, 4B, the rotational motion is induced by the engagement of the triangularly shaped first clipping features 301 with the inclined surface-containing slots of the second clipping features 401. The engagement and alignment of the first clipping feature 301 and the second clipping feature 401 is such that the first gripping portion 111 engages and slides along the second gripping portion 117 to induce motion about a center axis 501 (see FIG. 5).

Figure 4B:
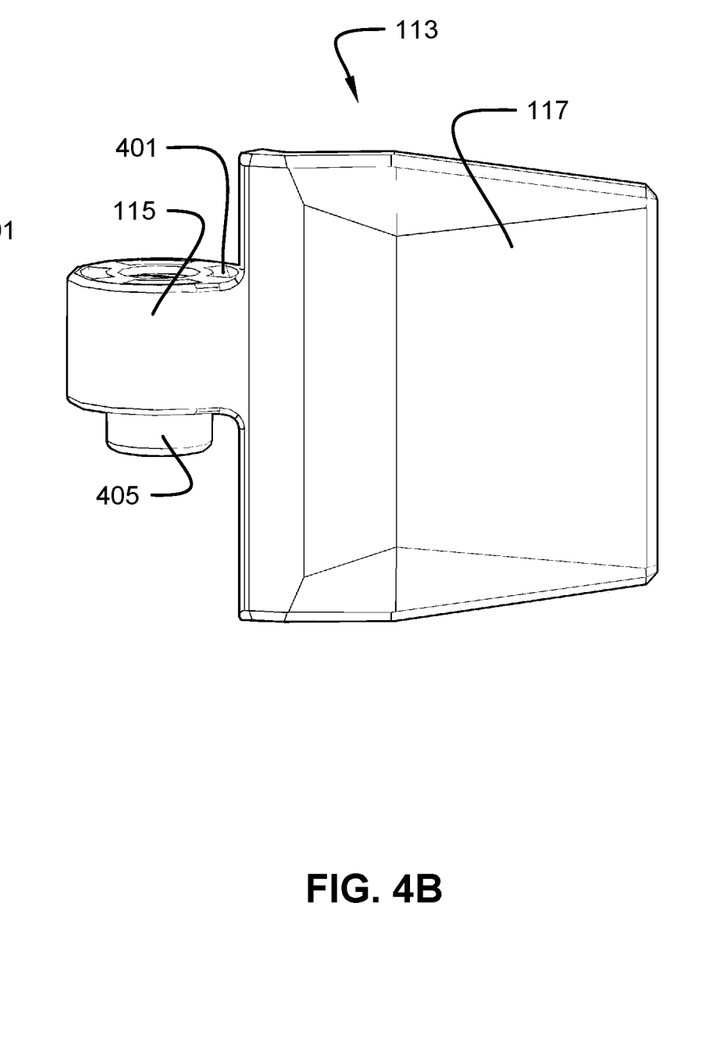
FIG. 4B shows a perspective view of a second clipping member of the multi-component installation clip of FIG. 1 shown from the side.
Figure 5:
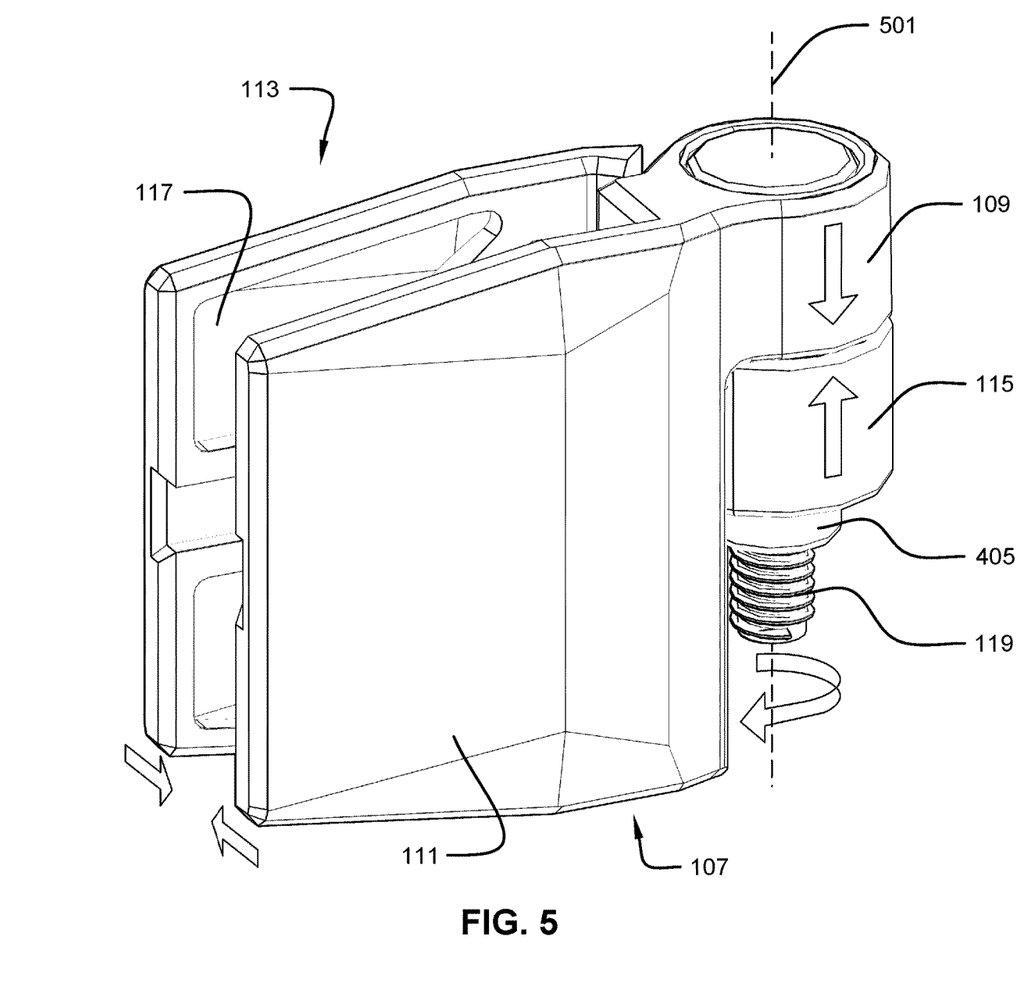
FIG. 5 shows a perspective view of the first clipping member and second clipping member of the multi-component installation clip of FIG. 1 being actuated with a fastener according to an embodiment of the present disclosure.
Figure 6:
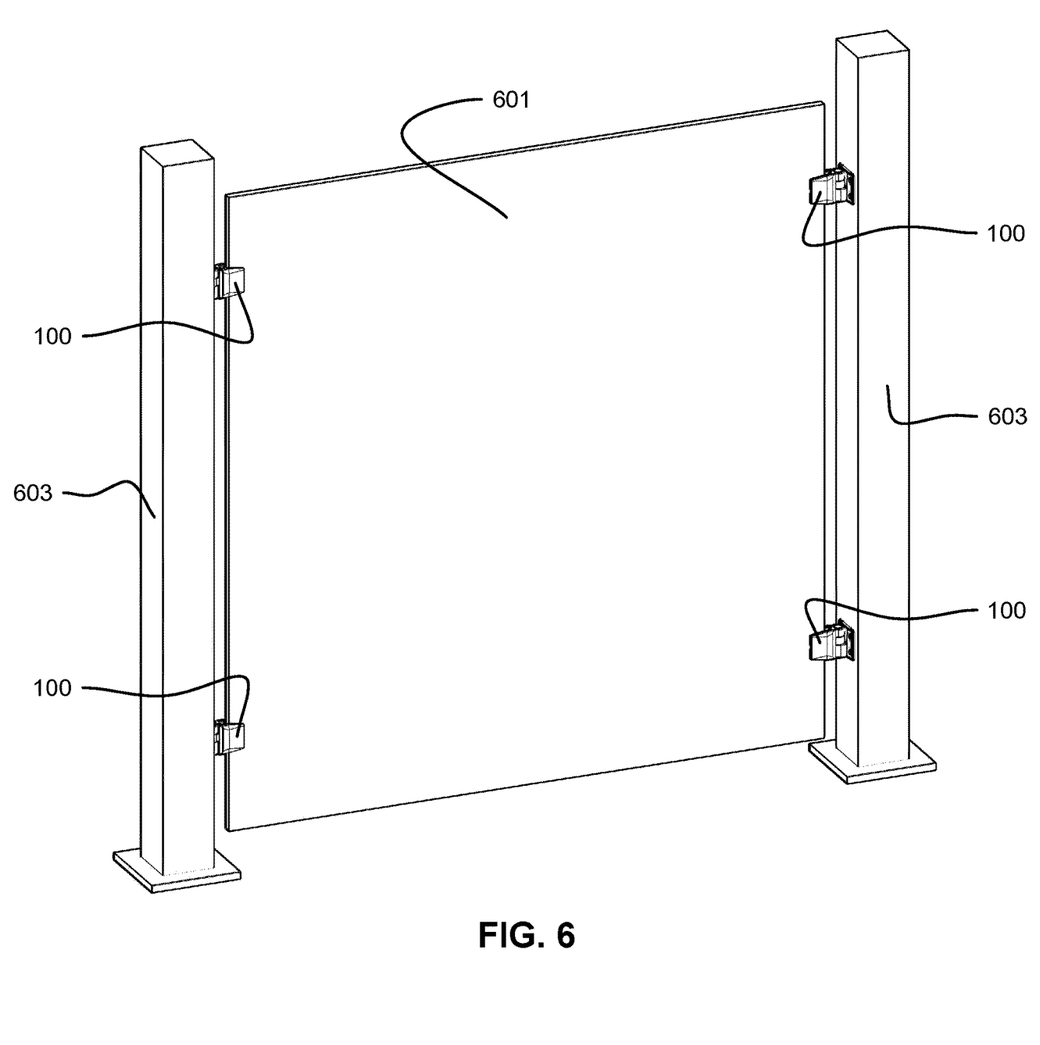
FIG. 6 shows a perspective view of a panel installation according to an embodiment of the present disclosure.
Figure 8:
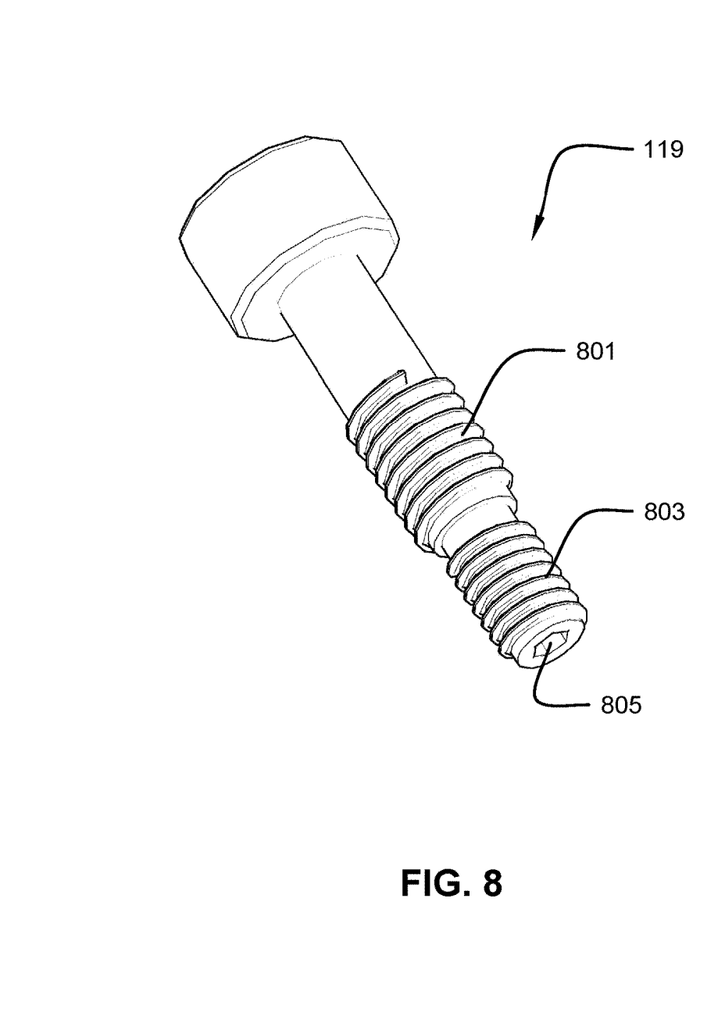
FIG. 8 shows a perspective view of the fastener of the multi-component installation clip of FIG. 1 according to an embodiment of the present disclosure.

The first attachment portion 109 has a first aperture 303 that permits passage of a fastener 119 along a center axis 501 of the first aperture 303 (see also FIG. 5). The first aperture 303 includes a circumferential ledge 305 onto which a head of a fastener 119 may rest. In one embodiment, the drawing together of the first attachment portion 109 and the second attachment portion 115 is accomplished by rotating fastener 119 and driving the fastener 119 into second attachment portion 115. The retention of the head of fastener 119 on circumferential ledge 305 is such that fastener 119 may rotate, but the head of fastener 119 is supported against the surface of circumferential ledge 305 and draws the first attachment portion 109 toward the second attachment portion 115 as the fastener 119 is advanced into the second attachment portion 115. The second attachment portion 115 has a threaded second aperture 403 that receives a first threaded portion 801 of fastener 119 (see FIG. 8). As shown in FIG. 8, fastener 119 includes a fastener drive feature 805 at the distal end of the shank from the head of the fastener 119. In this embodiment shown, the fastener drive feature 805 has a hex geometry, but is not so limited. The fastener drive feature 805 may have any suitable geometry that permits driving of the fastener 119 into the threaded portion of the second attachment portion 115 to draw the first attachment portion 109 and the second attachment portion 115 together. In another embodiment, a retaining spring may be arranged and disposed to draw the first attachment portion and the second attachment portion together. In this embodiment, the retaining spring is a force producing device, such as a spring, the retaining spring is engaged with each of the first attachment portion 109 and the second attachment portion 115 in a way that draws the first attachment portion 109 and the second attachment portion 115 together.

Figure 4A:
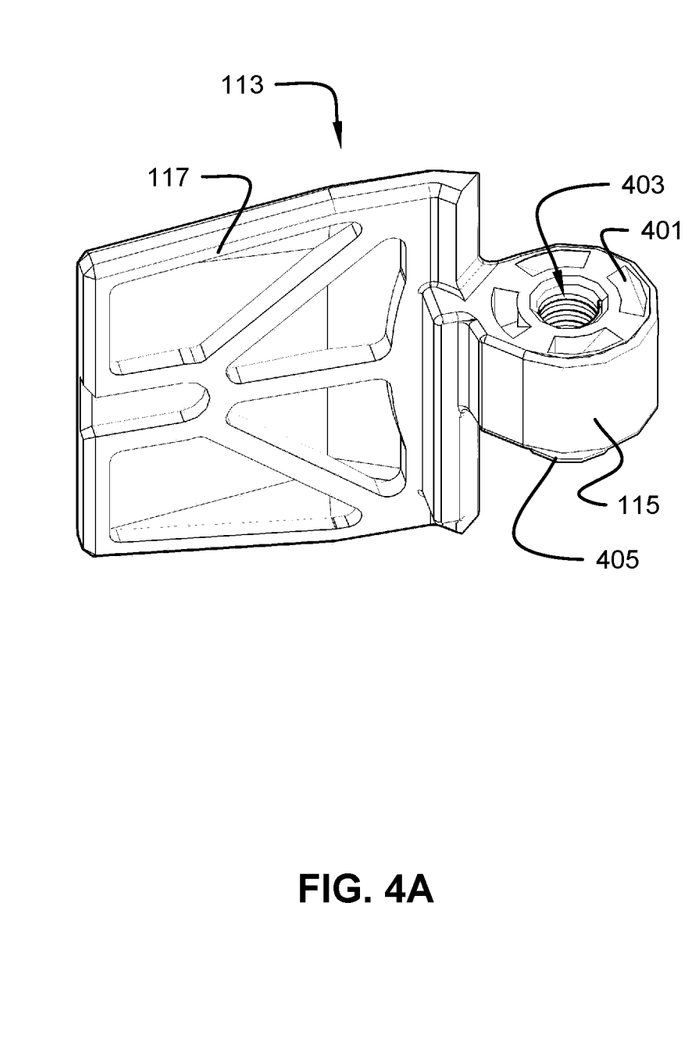
FIG. 4A shows a perspective view of a second clipping member of the multi-component installation clip of FIG. 1 shown from the side and above.

The second clipping member 113 includes an attachment feature 405 best visible in FIGS. 4 and 5. The multi-component installation clip 100 according to the present disclosure may swing or swivel about the center axis 500 (see for example FIG. 5). The attachment feature 405 is a protrusion or other mechanical feature that is arranged and disposed to engage the receiving portion 105 of the base member 101. The attachment feature 405 permits pivoting of the first clipping member 107 and the second clipping member 113 about center axis 501 to allow installation of the panel components 601 at various angles to the support member 603 (see FIG. 6). In one embodiment, the engagement of the attachment feature 405 to the receiving portion 105 of the base member 101 permits a swivel of the attachment feature 405 of up to 140 degrees about the center axis 500. In the embodiment shown, attachment feature 405 is a cylindrical geometry. However, the attachment feature 405 may be any suitable geometry to mate the receiving portion 105 of the base member 101. In other embodiments, the attachment feature 405 may be integrated into fastener 119.

Figure 7:
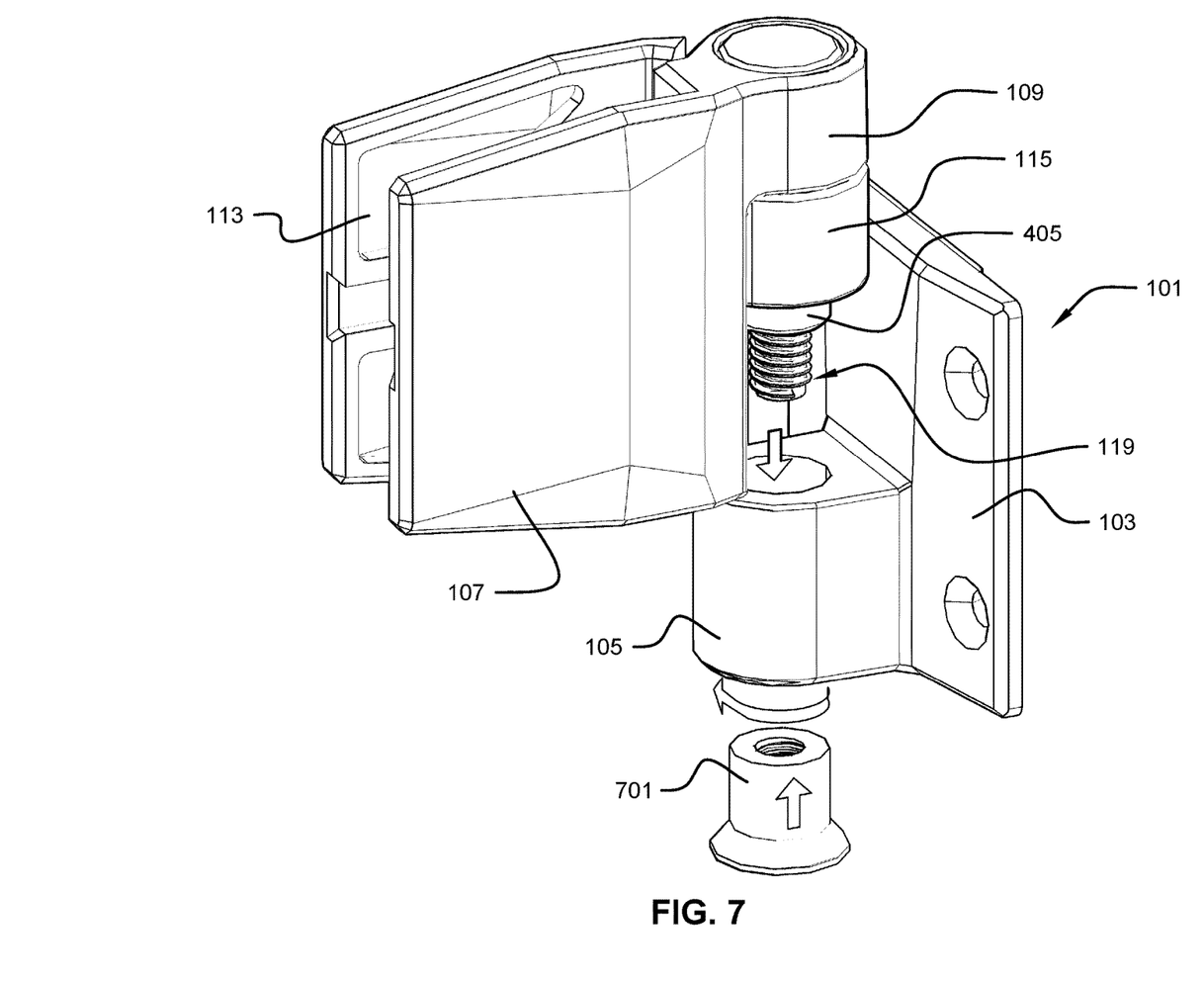
FIG. 7 shows a perspective view of the first clipping member and second clipping member of the multi-component installation clip of FIG. 1 being installed onto a base member according to an embodiment of the present disclosure.

As shown in FIG. 8, fastener 119 includes a second threaded portion 803 to receive retention member 701 (see FIG. 7). Fastener 119 may include both the first threaded portion 801 and the second threaded portion 803, wherein the first threaded portion 801 and the second threaded portion 803 have different threading than one another. For example, first threaded portion 801 may be tapped for a ⅜-16 thread and the second threaded portion 803 may be tapped for any suitable threading that is smaller than the threading of the first threaded portion 801. Further, the direction of the threading is not particularly limited and may be right-handed or clockwise threading, left-handed or counterclockwise threading, In addition, the first threaded portion 801 and the second threaded portion 803 may be threaded in the same direction or different directions. Retention member 701 may include an internally threaded fastener 119 or other nut-like component that has threading corresponding to the second threaded portion 803 of fastener 119. The retention member 701 may include a head having a drive feature with a hex geometry for driving the retention member 701 on the second threaded portion 803 of the fastener 119. However, the retention member 701 is not limited to a hex geometry and may include any other configuration of drive features that permit driven rotation of the retention member 701. The second attachment portion 115 also includes an attachment feature 405 for engagement with receiving portion 105 of base member 101. Fastener 119 is not limited to the fastener shown in FIG. 8 and may include other arrangements of fasteners, clips or other devices that are capable of drawing the first attachment portion 109 and second attachment portion 115 together. For example, in one embodiment, a retaining spring may be arranged and disposed to draw the first attachment portion and the second attachment portion together. In this embodiment, the retaining spring is a force producing device, such as a spring, the retaining spring is engaged with each of the first attachment portion 109 and the second attachment portion 115 in a way that draws the first attachment portion 109 and the second attachment portion 115 together. If a retaining spring is utilized a flat head bolt or other fastener may also be utilized in place of fastener 119 to stop rotation of the multi-component installation clip 100. In this embodiment, fastener 119 need not be utilized.

Figure 9:
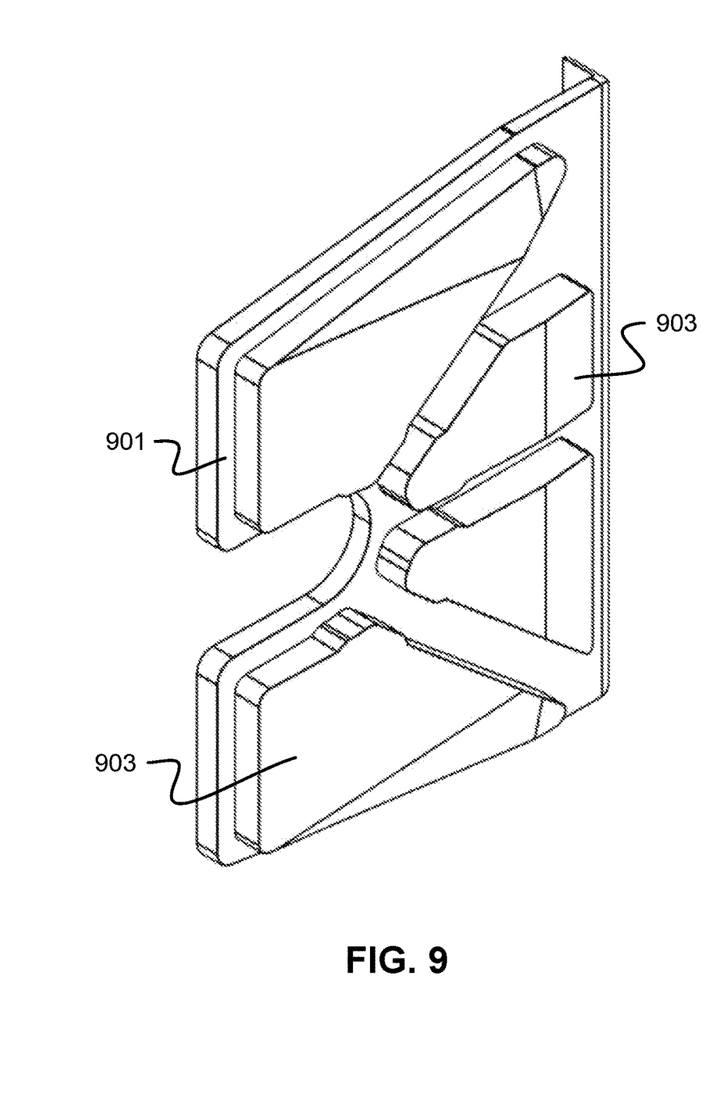
FIG. 9 shows a perspective view of a contact barrier according to an embodiment of the present disclosure.

FIG. 9 shows a contact barrier 901 that may be positioned, in certain embodiments, on each of the first gripping portion 111 and the second gripping portion 117 to protect and further grip the panel component 601. Alignment features 903 position the contact barrier 901 onto the first gripping portion 111 and the second gripping portion 117 into a position that permits the contact barrier 901 to be retained. Contact barrier 901 may be fabricated from any suitable material. In certain embodiments, including embodiments where the panel component 601 is plate glass, the contact barrier 901 is fabricated from rubber or elastomeric polymer. Other materials may be utilized to provide protection and gripping for specific materials utilized for the panel component 601. Contact barrier 901 is not limited to the configuration shown in FIG. 9 and may have any suitable geometry that permits retention on the first gripping portion 111 and the second gripping portion 117 and engages the panel component 601.

Another embodiment of the present disclosure includes a method 1000 of installing a panel component 601. The installation method includes providing a multi-component installation clip 100 and panel component 601 (step 1001). An exemplary multi-component installation clip 100 includes a clip having the arrangement shown and described with respect to FIG. 1. In this embodiment, the multi-component installation clip 100 includes a first clipping member 107 having a first attachment portion 109 and a first gripping portion 111, a second clipping member 113 having a second attachment portion 115 and a second gripping portion 117, and a base member 101 having a base plate 103 and a receiving portion 105 extending from the base plate 103. The method further includes attaching the base member 101 to a support member 603 (see FIG. 6) (step 1003). The support member 603 may be any support member known in the art for supporting panel construction. For example, the support member 603 may be a metal or non-metal post. The base member 101 is attached to a support member 603 utilizing any suitable method for attaching. For example, base member 101 may be attached to support member 603 utilizing fasteners 119, such as screws, bolts or nails. In the embodiment shown in FIG. 1, the base plate 103 includes apertures to receive screws or other fasteners to retain the base plate 103 against support member 603. The attachment method to the support member 603 is not so limited. In other embodiments, the base member 101 may be attached to the support member 603 utilizing adhesive or mechanical engagement. To attach the first clipping member 107 and the second clipping member 113 to a panel component 601, the panel component 601 is positioned between the first gripping portion 111 and the second gripping portion 117 (step 1005). A fastener 119 is inserted through the first attachment portion 109 of the first clipping member 107 (step 1007). The fastener 119 includes a first threaded portion 801 (see FIG. 8). The first threaded portion 801 of the fastener 119 is driven into a correspondingly threaded portion of the second attachment portion 115 by rotating fastener 119 (step 1009). In one embodiment, the fastener 119 is a screw that is rotated to drive the fastener 119 into threading of the second attachment portion 115 (see, for example, FIG. 5). As the fastener 119 advances along the correspondingly threaded portion of the second attachment portion 115, the first gripping portion 111 and second gripping portion 117 toward each other to grip the panel component 601 (step 1009). The fastener 119 is rotated until the first gripping portion 111 and the second gripping portion 117 are sufficiently pivoted toward each other to grip the panel component 601 (step 1011). Once the panel component 601 is sufficiently gripped, the first clipping member 107, the second clipping member 113 and the panel component 601 are engaged with one another and can be moved together for ultimate installation of the panel component 601.

Figure 10:
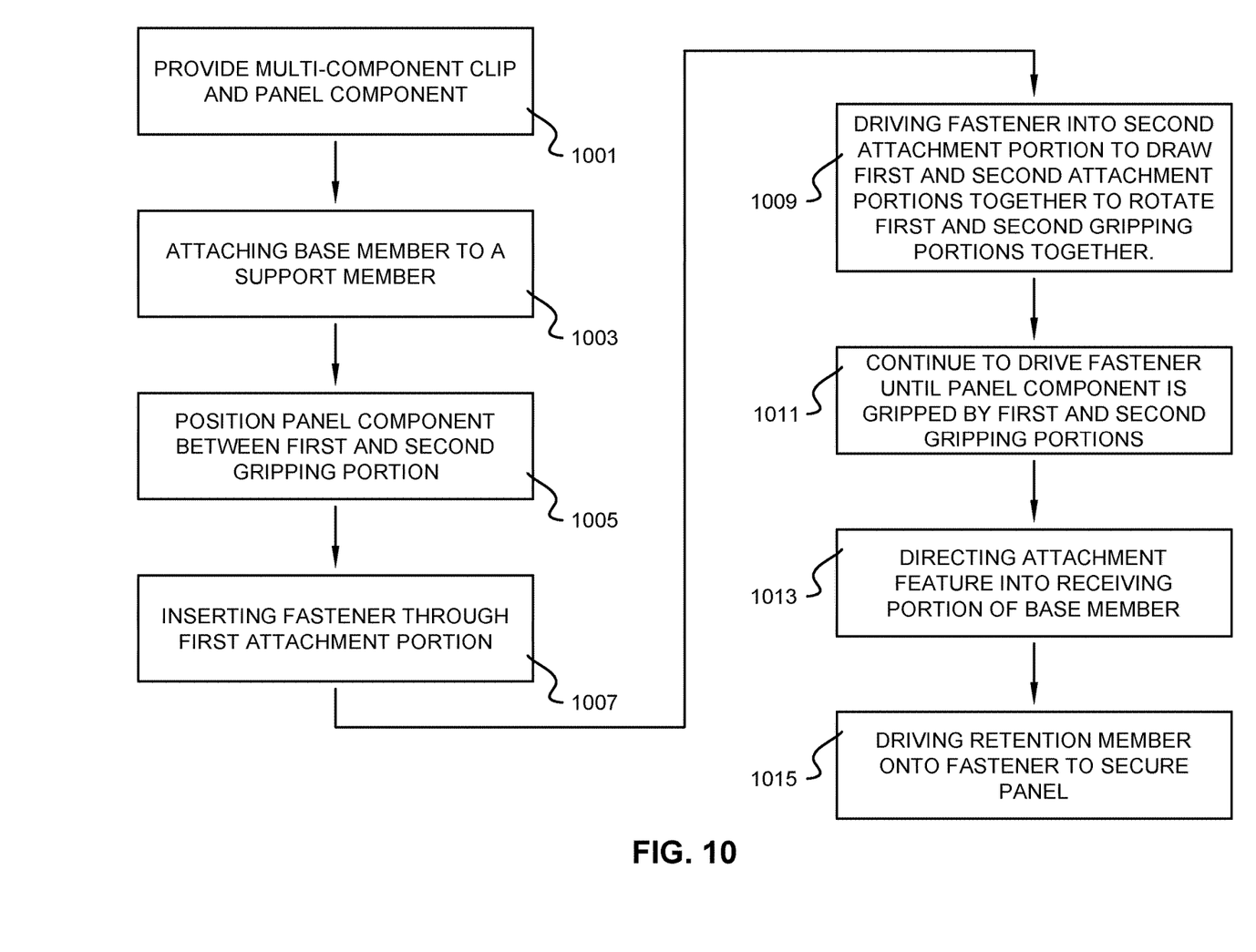
FIG. 10 shows a panel installation method according to an embodiment of the present disclosure.

As shown schematically in FIG. 7, to install the panel component 601 onto support member 603, the attachment feature 405 of the second attachment portion 115 is directed into the receiving portion 105 of the base member 101 (see for example, FIG. 7) (step 1013). Also, as shown in FIG. 7, a retention member 701 is driven onto a second threaded portion 803 of the fastener to secure the panel component 601 into position (step 1015).

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A multi-component installation clip comprising:
a base member comprising a base plate and a receiving portion extending from the base plate;
a first clipping member having a first attachment portion and a first gripping portion, the first attachment portion having a first clipping feature;
a second clipping member having a second attachment portion and a second gripping portion, the second attachment having a second clipping feature; and
the second attachment portion having an attachment feature arranged and disposed to engage the receiving portion of the base member;
wherein the first clipping feature and the second clipping feature are configured to engage each other and induce rotation as the first attachment portion and the second attachment portion are drawn together, the rotation induced being a pivoting of the first gripping portion and the second gripping portion about a center axis in a direction toward each other to grip a panel component.

2. The multi-component installation clip according to claim 1, wherein the first clipping feature is one or more protrusions extending from the first clipping member and the second clipping feature is one or more slots, each of the one or more slots having an inclined surface arranged and disposed to provide a sliding engagement with the one or more protrusions.

3. The multi-component installation clip according to claim 2, wherein the one or more protrusions have a triangular geometry.

4. The multi-component installation clip according to claim 1, the first attachment portion has a first aperture that permits passage of a fastener along a center axis of the first aperture, the first aperture includes a circumferential ledge onto which a head of the fastener is retained and the second attachment portion has a threaded second aperture that receives a first threaded portion of the fastener.

5. The multi-component installation clip according to claim 4, wherein the fastener includes both the first threaded portion and a second threaded portion, wherein the first threaded portion and the second threaded portion have different threading than one another.

6. The multi-component installation clip according to claim 5, further comprising a retention member having threading to receive the second threaded portion of the fastener.

7. The multi-component installation clip according to claim 6, wherein the retention member includes a retention member drive feature having a hex geometry for driving the retention member on the second threaded portion of the fastener.

8. The multi-component installation clip according to claim 4, wherein the fastener includes a fastener drive feature having a hex geometry for driving the fastener into the threaded second aperture.

9. The multi-component installation clip according to claim 1, further comprising a contact barrier on each of the first gripping portion and the second gripping portion.

10. The multi-component installation clip according to claim 1, wherein the engagement of the attachment feature to the receiving portion of the base member permits a swivel of the attachment feature about the center axis.

11. A method for installing a panel component, the method comprising:
providing a multi-component installation clip comprising:
a first clipping member having a first attachment portion and a first gripping portion;
a second clipping member having a second attachment portion and a second gripping portion; and
a base member having a base plate and a receiving portion extending from the base plate;
attaching the base member to a support member;
positioning a panel component between the first gripping portion and the second gripping portion;
inserting a fastener through the first attachment portion;
driving a first threaded portion of the fastener into a correspondingly threaded portion of the second attachment portion to urge the first gripping portion and second gripping portion toward each other to grip the pane component;
directing an attachment feature of the second attachment portion into the receiving portion; and
driving a retention member onto a second threaded portion of the fastener to secure the panel component into position.

12. The method according to claim 11, wherein the panel component is fabricated from a material selected from the group consisting of glass, metal, wood and polymer.

13. The method according to claim 12, wherein the panel component is plate glass.

14. The method according to claim 11, wherein the first clipping feature is one or more protrusions extending from the first clipping member and the second clipping feature is one or more slots, each of the one or more slots having an inclined surface arranged and disposed to provide a sliding engagement with the one or more protrusions.

15. The method according to claim 14, wherein the one or more protrusions have a triangular geometry.

16. The method according to claim 11, wherein the fastener includes both the first threaded portion and a second threaded portion, wherein the first threaded portion and the second threaded portion have different threading than one another.

17. The method according to claim 11, wherein the driving of retention member includes rotating the retention member to drive internal threading onto the second threaded portion of the fastener.

18. The method according to claim 11, wherein driving the fastener includes rotating the fastener with a fastener drive feature for driving the fastener into the threaded second aperture.

19. The method according to claim 18, wherein the fastener drive feature includes a hex geometry.

20. The method according to claim 18, wherein the fastener drive feature is located at a distal end of a shank from a head of the fastener.

21. The method according to claim 11, wherein the multi-component installation clip further comprises a contact barrier on each of the first gripping portion and the second gripping portion.

22. The method according to claim 11, wherein the directing the attachment feature of the second attachment portion into the receiving portion includes swiveling of the attachment feature about the center axis.

\* \* \* \* \*